US006178373B1

(12) United States Patent
Davis et al.

(10) Patent No.: US 6,178,373 B1
(45) Date of Patent: Jan. 23, 2001

(54) ENGINE CONTROL METHOD USING REAL-TIME ENGINE SYSTEM MODEL

(75) Inventors: George Carver Davis, Ypsilanti; Rodney John Tabaczynski, Saline; Wengang Dai, Canton, all of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/289,762

(22) Filed: Apr. 12, 1999

(51) Int. Cl.$^{7}$ .................... B60T 7/12

(52) U.S. Cl. .................... 701/104; 701/105; 701/108; 123/406.47; 123/406.48; 123/406.44

(58) Field of Search .................... 701/104, 105, 701/108, 109; 123/406.47, 406.48, 406.49

(56) References Cited

U.S. PATENT DOCUMENTS

| | | | | |
|---|---|---|---|---|
| 4,793,825 | | 12/1988 | Benjamin et al. . | |
| 5,121,820 | * | 6/1992 | Brown et al. | 192/3.3 |
| 5,270,935 | * | 12/1993 | Dudek et al. | 364/431.01 |
| 5,279,607 | | 1/1994 | Schentag et al. . | |
| 5,293,553 | * | 3/1994 | Dudek et al. | 364/431.04 |
| 5,417,663 | | 5/1995 | Slettenmark . | |
| 5,513,636 | | 5/1996 | Palti . | |
| 5,531,208 | * | 7/1996 | Hasegawa et al. | 123/673 |
| 5,876,675 | | 3/1999 | Kennedy . | |

FOREIGN PATENT DOCUMENTS

| | | |
|---|---|---|
| 0897690 | 2/1999 | (EP) . |

* cited by examiner

*Primary Examiner*—Hoang Nguyen
(74) *Attorney, Agent, or Firm*—Jerome R. Drouillard

(57) ABSTRACT

An engine control method for an internal combustion engine having a powertrain control module (PCM). The powertrain control module includes a microprocessor and associated memory. A mathematical model of the engine cycle of the engine system is stored in the PCM memory. The PCM continuously monitors a variety of engine operating parameters. From these inputs, the PCM generates optimized control setpoints for the intake airflow, fueling right, spark timing and EGR flow for the engine using the mathematical model. The setpoints are generated in real-time for every engine cycle, and the engine is then operated in accordance with the generated control setpoints. In another aspect of the invention, the engine model includes submodels for fuel delivery, the in-cylinder processes, the engine heat capacitance and cooling system, engine friction, airflow, engine inertia, and the front-end auxiliary drive. The disclosed engine control method is advantageous in that it allows optimum engine performance in any operating environment.

9 Claims, 1 Drawing Sheet

ENGINE CONTROL METHOD USING REAL-TIME ENGINE SYSTEM MODEL

BACKGROUND

This invention relates generally to internal combustion engines and more particularly concerns a method for generating engine calibration parameters in real-time using a mathematical model of the engine system and combustion process.

Internal combustion engines are designed and developed in several phases. At a minimum, the engine concept is assessed, the design is engineered, and the manufacturing issues are resolved. In the final phase of engine development, the engine is mapped and calibrated for optimized performance.

Engine mapping and calibration seeks to optimize the setpoints for fuel flow, airflow (including the amount of exhaust gas recirculation (EGR)), and spark ignition timing to balance the competing interests of achieving the lowest possible emissions, the best possible fuel economy, and satisfactory performance. The engine mapping and calibration process is both costly and time consuming. All potential combinations of a variety of engine operating parameters must be analyzed and associated to set points for airflow, fueling rate and spark timing. The result of the engine mapping and calibration process is a series of detailed lookup tables storing engine subsystem setpoints for these combinations of engine operating parameters. The resulting tables are stored in the powertrain control module (PCM) for use in engine control. For example, a desired EGR valve setpoint would be retrieved from the lookup table of values based upon the operating inputs of engine speed, load, and airflow, for instance.

One drawback to using calibrated look-up tables for engine control, however, is that the calibration tables are developed based upon assumptions for the engine operating environment such as the air quality and fuel grade. Thus, if the engine operating environment differs significantly from the assumed environment for which the calibration tables were developed, the engine control strategy will not be optimized. In such a case, the engine must be remapped and new calibration tables developed if the engine is to be optimized for its environment. In other words, a vehicle operating in a thin air environment such as a high altitude location may require different lookup table values than a vehicle in a very dry air environment such as a desert location. Indeed, most calibrated lookup table setpoints are actually compromised, rather than global optimized, to allow acceptable engine performance over a wider variety of operating environments.

SUMMARY OF THE INVENTION

Accordingly, it is an object of the present invention to provide an improved engine control method.

Another object is an engine control method which provides real-time calibration setpoints based upon a mathematical model of the engine rather than predefined setpoints based upon assumed environmental operating conditions.

According to the present invention, the foregoing and other objects and advantages are attained by a real-time control method for an internal combustion engine having a powertrain control module which includes a microprocessor and associated memory. The method includes the steps of storing a mathematical model of the engine system in the PCM memory and continuously monitoring a variety of engine operating parameters. From these inputs, the PCM generates optimized calibration setpoints for the intake air flow, fueling right, spark timing and EGR flow for the engine using the stored mathematical model. The setpoints are generated in real-time for every engine cycle, and the engine is then operated in accordance with the generated control setpoints.

In another aspect of the invention, the engine model includes submodels for fuel delivery, the in-cylinder processes, engine heat capacitance and cooling, engine friction, air flow, engine inertia, and the front-end auxiliary drive.

One advantage of the present method is optimized control setpoints for all engine operated environments.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DESCRIPTION OF THE PREFERRED EMBODIMENT

Figure 1:
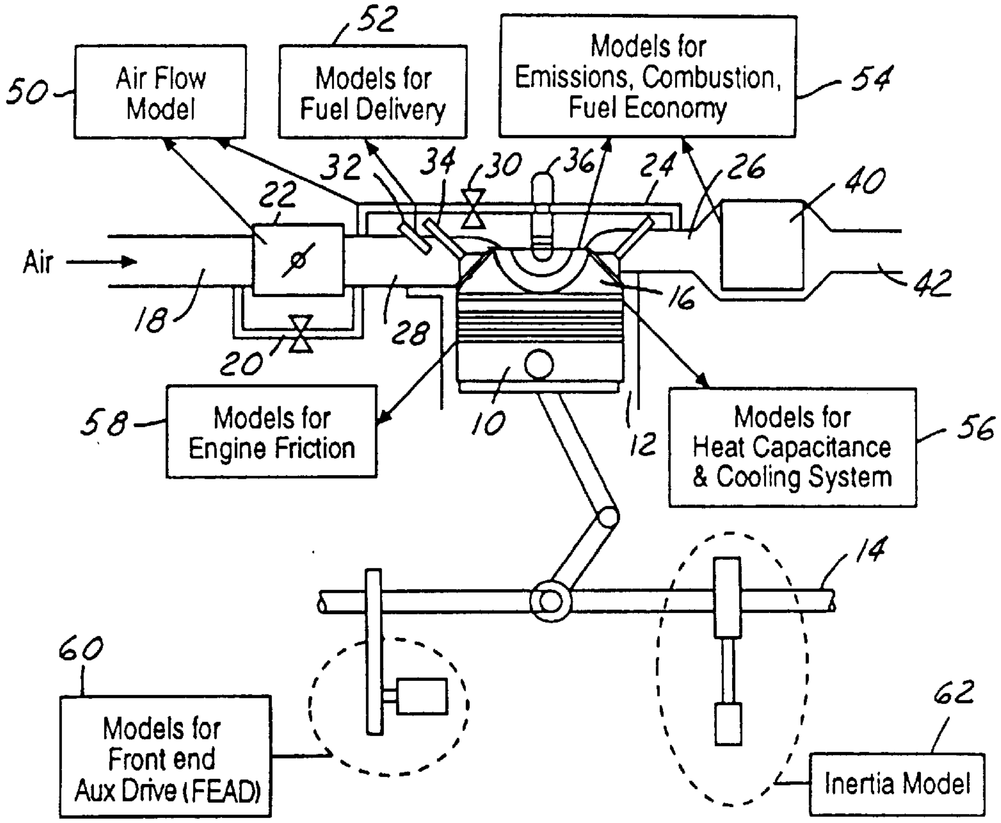
FIG. 1 is a schematic diagram of a mathematical model of an internal combustion engine system.

Referring to FIG. 1, there is shown a schematic diagram of the engine cycle as it relates to one cylinder of a multi-cylinder, spark-ignited internal combustion engine. In FIG. 1, there is shown a piston 10 which reciprocates in cylinder 12 to deliver power to the crankshaft 14 which is used to power the vehicle. Air enters the combustion chamber 16 through the intake manifold 18. Air is metered by the air bypass valve 20 and the angle of the throttle 22. Conduit 24 directs exhaust gas from the exhaust manifold 26 to the engine intake 28. The amount of EGR flow is regulated by EGR valve 30. Fuel is delivered into the combustion chamber by fuel injector 32. Intake valve 34 allows the fuel, ambient air, and recirculated exhaust gas to enter the combustion chamber 16. The air/fuel mixture is then compressed by piston 10, and ignited by spark plug 36. Once combustion has occurred, the combustion gases are vented through exhaust valve 38 into the exhaust manifold 26. Catalytic converter 40 reacts with the exhaust gases to minimize the undesired emissions emitting from the exhaust pipe 42.

Many different factors effect the performance of the combustion process just described. Presently, the combustion process is optimized in terms of emissions, fuel economy and performance by mapping and calibrating the engine. For example, a dynamometer is typically used to develop setpoints for controlled engine variables. These values are then stored in look-up tables indexed by engine operating parameters. The present invention, however, eliminates the need for look-up tables by mathematically modeling the engine systems which effect performance. The inputs to the mathematical models are the same as those conventionally used to retrieve look-up table values such as the air/fuel ratio, the amount of EGR flow, the spark-ignition timing, and the engine speed.

According to one aspect of the invention, the entire engine system is described by several submodels. These include: (1) a model 50 for the air flow which includes the throttle angle 22, air bypass 20, and EGR flow 30; (2) a model 52 for fuel delivery including the amount of wall wetting; (3) a model 54 for emissions, combustion and fuel economy; (4) models 56 for engine heat capacitance and the cooling system; (5) a friction model 58; (6) a model for the front-end auxiliary drive (FEAD) which includes the air conditioning load, alternator load and power steering load; and (7) an engine inertia model 62.

Figure 2:
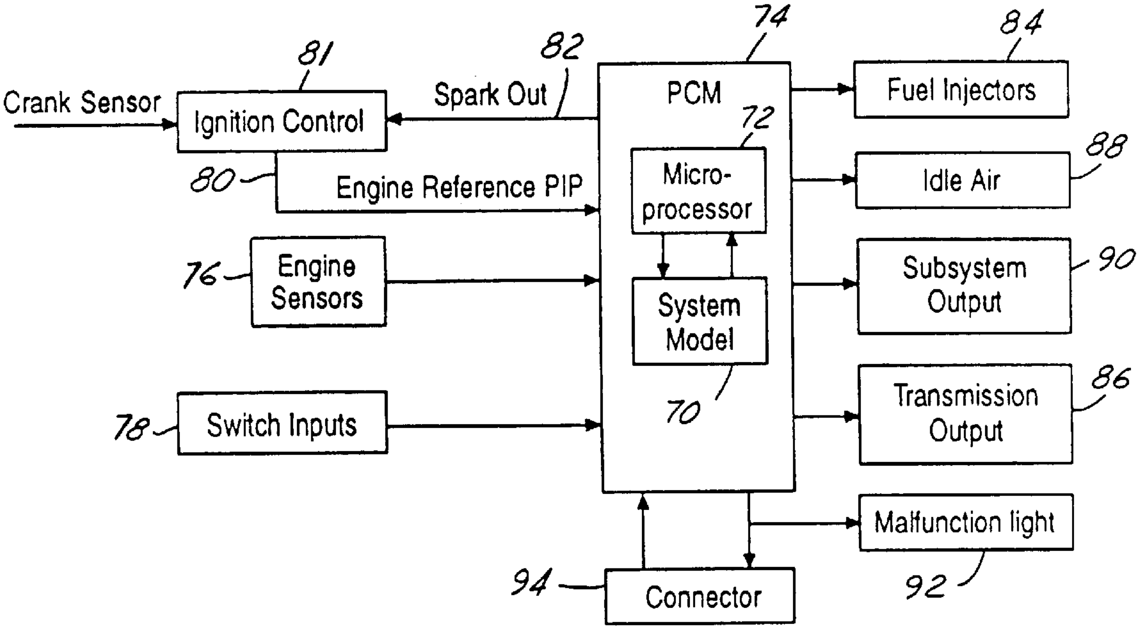
FIG. 2 is a schematic block diagram of an engine control system in accordance one embodiment of the present invention.

Referring to FIG. 2, these models are stored in memory 70 which is part of the logic accessed by the microprocessor 72 of the powertrain control module (PCM) 74. These system models stored in memory 70 replace the look-up tables conventionally stored in memory 70 of the PCM 74.

The implementation of the PCM 74 in the overall engine system is intended to be otherwise conventional. Accordingly, the PCM receives inputs from engine sensors 76 and switch inputs 78 as well as an engine reference signal 80. Using these inputs, the PCM 74 controls the spark timing output 82, fuel system 84, the transmission output 86, the airflow 88 as well as other subsystem outputs such as the EGR control 90 and diagnostic indicators 92. The PCM 74 is powered by the engine electrical system via connector 94.

Engine sensors 76 include such things as mass airflow, manifold absolute pressure, fuel flow, spark timing, engine speed and EGR flow. The switch inputs 78 include such things as the air conditioning and power steering system load.

In operation, inputs from the engine sensors 76 and switch input 78 are fed to the microprocessor 72 which accesses the engine system models in memory 70 to compute in real-time, for each engine cycle, the optimized control parameters for the fuel flow, airflow and spark timing. To increase the computational speed, the control system preferably takes advantage of existing sensors rather than modeling every engine subsystem. For example, instead of accessing an airflow model to compute airflow rate, a mass air flow sensor can be used. Mass airflow sensors are typically part of conventional engine control systems. As a result, the manifold pressure wave dynamics need not be modeled.

By using models of the engine subsystems and deriving engine operating setpoints in real-time from the engine inputs, engine performance is continuously optimized for any operating environment. Thus from the foregoing, it will be seen that there has been brought to the art a new and improved engine control method which overcomes the drawbacks associated with prior lookup table-based engine control strategies which are developed by engine mapping and calibration under given environmental assumptions.

While the invention has been described in connection with one or more embodiments, it will be understood that the invention is not limited to those embodiments. On the contrary, the invention covers all alternatives, modifications, and equivalents, as may be included with the spirit and scope of the appended claims.

What is claimed is:

1. A real-time calibration method for an internal combustion engine having a powertrain control module including a microprocessor and associated memory comprising the steps of:

storing in said memory a mathematical model of the combustion cycle of said engine system said mathematical model comprising at least two models selected from the group consisting of a fuel delivery model, a model of in-cylinder processes, a heat capacitance and cooling system model, an engine friction model, an airflow model, and an engine inertia model;

continuously monitoring at least one engine operating parameter;

generating control setpoints for intake air, fueling rate, spark timing, and exhaust gas recirculation for said engine with said mathematical model as a function of said engine operating parameters per every engine cycle; and operating said engine in accordance with said control setpoints.

2. The engine control method as set forth in claim 1 wherein the step of storing in said memory a mathematical model of the combustion cycle of said engine system further includes storing in said memory a front-end auxiliary drive model.

3. The engine control method as set forth in claim 1 wherein the step of continuously monitoring a plurality of engine operating parameters includes for each engine cycle the steps of:

determining an AFR value indicative of the air/fuel ratio of the in-cylinder mixture of the engine;

determining an EGR value indicative of the amount of exhaust gas recirculation in the engine; and determining an SI value indicative of the spark-ignition timing of the engine.

4. A powertrain control module for controlling the operation of an internal combustion engine comprising a microprocessor and associated memory including a mathematical model of the engine cycle of said internal combustion engine said mathematical model comprising at least two models selected from the group consisting of a fuel delivery model, a model of the in-cylinder processes of said engine, a heat capacitance and cooling system model, an engine friction model, an airflow model, and an engine inertia model, and wherein said microprocessor is programmed for each engine cycle to:

receive as inputs a plurality of engine operating parameters;

generate control setpoints for intake air, fueling rate, spark timing and exhaust gas recirculation for said engine with said mathematical model as a function of said engine operating parameters; and output said control setpoints to the respective associated engine subsystem.

5. The powertrain control module of claim 4 wherein said microprocessor memory includes a front-end auxiliary drive model.

6. The powertrain control module of claim 4 wherein said microprocessor is programmed for each engine cycle to:

determine an AFPR value indicative of the air/fuel ratio of the in-cylinder mixture of the engine;

determine an EGR value indicative of the amount of exhaust gas recirculation in the engine;

determine an SI value indicative of the spark-ignition timing of the engine;

generate control setpoints for intake air, fueling rate, spark timing and exhaust gas recirculation for said engine with said mathematical model as a function of said AFR, EGR and SI values; and output said control setpoints to the respective associated engine subsystem.

7. In an internal combustion engine system controlled by a powertrain control module which receives as inputs a plurality of engine operating parameters and outputs a plurality of control setpoints, said powertrain control module including a microprocessor and associated memory, a method of controlling said internal combustion engine comprising the steps of:

inputting said plurality of engine operating parameters into a mathematical model of said engine system said mathematical model including at least two models selected from the group consisting of a fuel delivery model, a model of the in-cylinder processes of said engine, a heat capacitance and cooling system model, an engine friction model, an airflow model, and an engine inertia model;

calculating in real-time, control setpoints for intake air, fueling rate, spark timing and exhaust gas recirculation for said engine with said mathematical model as a function of said plurality of engine operating parameters; and outputting said control setpoints to the respective associated engine subsystems.

8. The method as set forth in claim 7 wherein the step of inputting said plurality of engine operating parameters into a mathematical model of said engine system includes the steps of:

inputting an AFR value indicative of the air/fuel ratio of the in-cylinder mixture of the engine;

inputting an EGR value indicative of the amount of exhaust gas recirculation in the engine; and inputting an SI value indicative of the spark-ignition timing of the engine.

9. The method as set forth in claim 7 wherein the step of inputting said plurality of engine operating parameters into a mathematical model of the combustion cycle of said engine system includes the step of inputting said plurality of engine operating parameters into a front-end auxiliary drive model.

* * * * *